May 13, 1969     J. A. BOSTON     3,443,724
SEED AND FERTILIZER INDICATOR
Filed Jan. 19, 1968
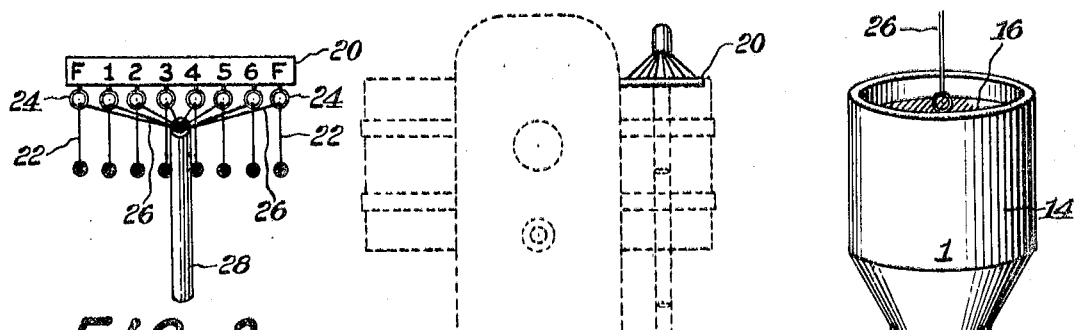
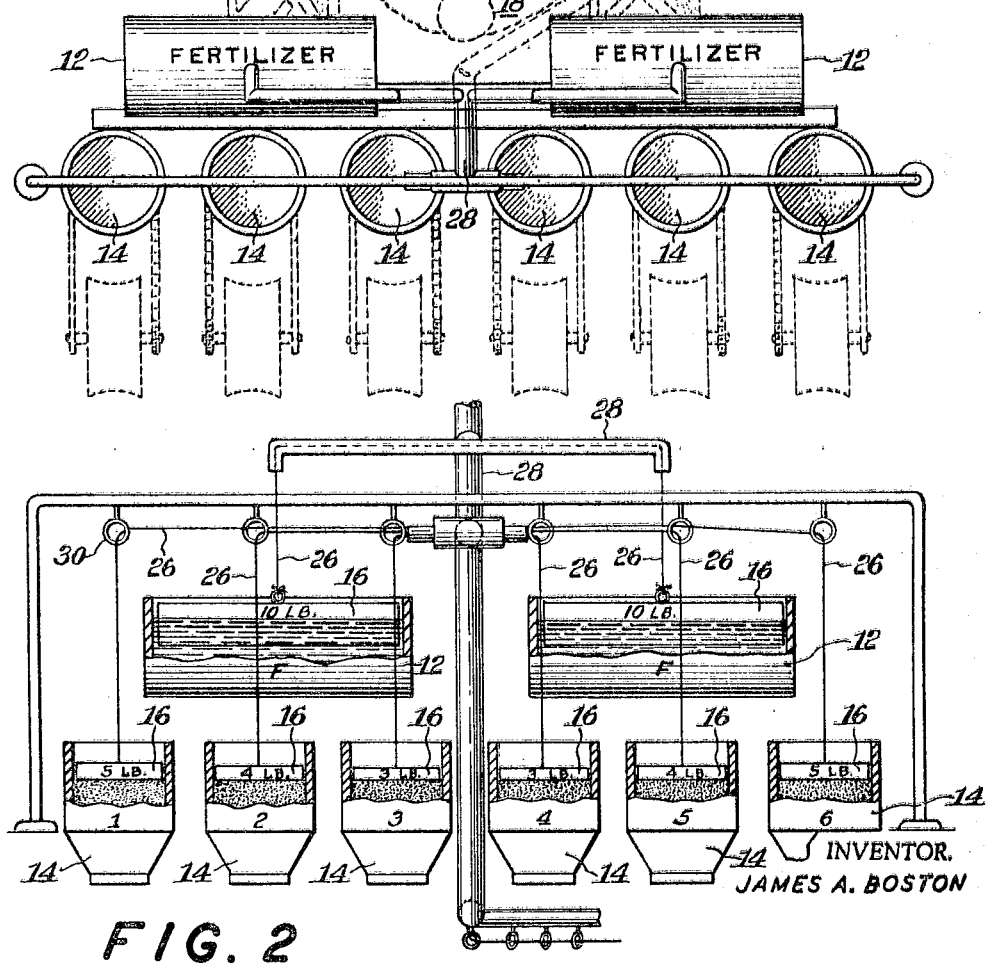

3,443,724
SEED AND FERTILIZER INDICATOR
James A. Boston, 978 E. 226, Bronx, N.Y. 10451
Filed Jan. 19, 1968, Ser. No. 699,091
Int. Cl. B67d 5/06, 5/16, 5/22
U.S. Cl. 222—26      5 Claims

ABSTRACT OF THE DISCLOSURE

Apparatus adapted to be secured to a tractor for utilization in spreading seed, fertilizer and the like which provides a continuous visual indication of proper or faulty operation whereby the operator of the tractor always knows how his apparatus is functioning and whether corrective action should be taken.

SUMMARY OF THE INVENTION

My apparatus contemplates a plurality of hollow containers disposed vertically upwards side by side at the rear of the tractor and containing material in granular form such as seed and/or fertilizer to be spread. The top end of each container is open to permit loading of the material therein. The bottom end of each container has an opening through which the material flows downward by gravity onto the earth as the tractor moves.

A display panel mounted in such manner on the tractor as to be viewable by the operator is provided with a like plurality of container material level indicating gauges.

A like plurality of material level, indication means are associated with the containers, each means being disposed within a corresponding container and moving up or down therein with changes in the level of the material therein to indicate at any time the level.

Finally I provide means connecting each material level indication means to a corresponding material level indicating gauge whereby the operator of the tractor, without requiring the conventional additional man to visually monitor the containers to see if clogging and faulty spreading occurs, can himself so monitor by inspecting the gauges in the display panel.

BRIEF DESCRIPTION OF THE DRAWINGS

In the drawings:
FIG. 1 is a top view of my apparatus in use;
FIG. 2 is an end view thereof;
FIG. 3 is a view of the gauges; and
FIG. 4 is a view of a container.

DETAILED DESCRIPTION OF PREFERRED EMBODIMENT

Referring now to FIGS. 1–4, a tractor 10 has at the rear thereof two containers 12 having fertilizer therein and six containers 14 having seeds or the like therein. The spreading operation is carried out conventionally.

Flat weighted lids 16 which can be of different weights are each disposed in a corresponding container and rest upon the material therein. As the material flows out and is spread, the lid moves downward and thus at any time indicates by its position the level of material therein.

Disposed in the view of an operator 18 riding on the tractor is a visual display panel 20 having a row of digits each of which identifies a separate container. Disposed below each digit is a separate material level indication gauge comprising a vertical wire and rod 22, the wire passing through eyelet 24. Each ball is connected via a separate cable or wire 26 disposed in hollow tubing 28 and where necessary via pulleys 30 to a corresponding lid 16 whereby movement of a lid causes a corresponding movement of the ball in the corresponding gauge.

When the material is being spread properly, the balls in the various gauges all move downward at the same rate and remain in horizontal alignment. In the event that clogging or faulty feeding occurs in one or more containers, the balls in the corresponding gauge or gauges will shift out of alignment, and the driver, noticing this shift, can stop the tractor and overcome the difficulty by making the appropriate repairs.

While I have described my invention with particular reference to the drawings, my protection is to be limited only by the terms of the claims which follow.

Having thus described my invention, I claim as new and desire to secure by Letters Patent:

1. Apparatus adapted to be secured to a tractor for utilization in spreading seed and fertilizer and the like, said apparatus comprising:
    a plurality of hollow containers disposed vertically upwards side by side at the rear of the tractor and having open top ends into which material to be spread is loaded and bottom ends with openings through which said material flows by gravity for spreading;
    a like plurality of material level indication means, each means being disposed in a corresponding container to indicate instantaneously the level of the material therein;
    a display panel adapted to be mounted in the front of the tractor, said panel having a like plurality of container material level indicating gauges;
    and means connecting said indication means to said gauges whereby a driver can visually determine the level of material in each container.

2. Apparatus as set forth in claim 1 wherein each indication means is a horizontal weighted lid slidable up and down in the corresponding container and resting on top of the material therein.

3. Apparatus as set forth in claim 2 wherein said connecting means comprises a like plurality of cables, each cable being connected between the corresponding lid and the corresponding gauge.

4. Apparatus as set forth in claim 3 wherein each gauge includes a vertical guide and an indicator slidable in a vertical plane along said guide.

5. Apparatus as set forth in claim 4 wherein each indicator is secured to one end of a corresponding cable.

References Cited

UNITED STATES PATENTS

| 923,183 | 6/1909 | Johnson | 222—45 X |
| 2,777,205 | 1/1957 | Plahn | 73—322 X |
| 3,202,323 | 8/1965 | Powell | 222—177 |

FOREIGN PATENTS 498,805    1/1920    France.

ROBERT B. REEVES, Primary Examiner.

H. S. LANE, Assistant Examiner.

U.S. Cl. X.R.

73—321; 116—114; 222—45, 176